(12) United States Patent
Drabarek

(10) Patent No.: US 7,187,450 B2
(45) Date of Patent: *Mar. 6, 2007

(54) INTERFEROMETRIC MEASURING DEVICE

(75) Inventor: Pawel Drabarek, Tiefenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/432,123

(22) PCT Filed: Nov. 7, 2001

(86) PCT No.: PCT/DE01/04184

§ 371 (c)(1),
(2), (4) Date: Nov. 5, 2003

(87) PCT Pub. No.: WO02/40936

PCT Pub. Date: May 23, 2002

(65) Prior Publication Data

US 2004/0061865 A1    Apr. 1, 2004

(30) Foreign Application Priority Data

Nov. 20, 2000 (DE) ............................. 100 57 540

(51) Int. Cl.
G01B 9/02 (2006.01)

(52) U.S. Cl. ...................... 356/497; 356/479

(58) Field of Classification Search ............. 356/497, 356/479
See application file for complete search history.

(56) References Cited

U.S. PATENT DOCUMENTS

| 4,652,131 | A |   | 3/1987  | Fercher et al. |         |
|-----------|---|---|---------|----------------|---------|
| 5,640,270 | A |   | 6/1997  | Aziz et al.    |         |
| 5,731,876 | A | * | 3/1998  | Venkatesh et al. | 356/503 |
| 6,490,046 | B1|   | 12/2002 | Drabarek et al. |        |
| 6,687,010 | B1| * | 2/2004  | Horii et al.   | 356/479 |
| 6,970,252 | B2| * | 11/2005 | Knuttel        | 356/497 |

FOREIGN PATENT DOCUMENTS

| DE | 198 08 273 | 9/1999  |
| DE | 198 19 762 | 11/1999 |
| EP | 0 126 475  | 11/1984 |

* cited by examiner

Primary Examiner—Hwa (Andrew) Lee
(74) Attorney, Agent, or Firm—Kenyon & Kenyon LLP

(57) ABSTRACT

An interferometric measuring device for measuring surface characteristics, shapes, distances, and changes in distance, for example vibrations, of measurement objects includes a probe section. A configuration with respect to ease of use and error-free scanning may be provided by the fact that the probe section is subdivided into a fixed probe section and a rotatable probe section mechanically and optically coupled thereto, and that a beam splitter is arranged in the rotatable probe section for creating a reference beam and a measuring beam for the interferometric measurement.

10 Claims, 1 Drawing Sheet

INTERFEROMETRIC MEASURING DEVICE

FIELD OF THE INVENTION

The present invention relates to an interferometric measuring device for measuring surface characteristics, shapes, distances, and changes in distance, for example vibrations, of measurement objects using a probe section.

BACKGROUND INFORMATION

An interferometric measuring device of this type is described in German Published Patent Application No. 198 08 273. In this conventional measuring device, the optical system of the measuring device in the interferometric measuring system is divided into two subsystems by coherence multiplexing: a modulation interferometer and a probe section. This probe section is easy to use, and includes a measuring head which enables measurements to be made even in relatively long, narrow boreholes. The measuring device is configured for multiwavelength interferometry, thereby extending the measurement range. For performing all-around scanning of a surface, in general the measurement object itself or the measuring device is rotatably driven. The drive operation is not always easy to perform, which may adversely affect the accuracy of the measurement.

In another interferometric measuring device of this type described in German Published Patent Application No. 198 19 762, various compact measuring probes are proposed for the measurement system, and the creation of the scanning motion may be associated with similar problems as mentioned above.

European Published Patent Application No. 0 126 475 describes a method and a device for contactless measurement of actual positions and/or the outline of rough surfaces, based on the concept of the multiwavelength heterodyne interferometer and including one or more lasers as a light source. Based on the principle of phase evaluation, the heterodyne technology may allow the influence of vibrations to be substantially suppressed; however, the above-referenced problems may arise with this procedure as well.

SUMMARY

An example embodiment of the present invention may provide an interferometric measuring device of the above-mentioned type which may, with the greatest possible ease of use, achieve greater accuracy in rotational scanning of the surface of a measurement object and which counteracts the interfering effect on measurement accuracy originating from the drive device.

According to an example embodiment of the present invention, the probe section may be subdivided into a fixed probe section and a rotatable probe section mechanically and optically coupled thereto, and a beam splitter is arranged in the rotatable probe section for creating a reference beam and a measuring beam for the interferometric measurement.

The subdivision of the probe section into a fixed and a rotatable probe section may allow a relatively simple configuration for scanning the measurement object, and may provide a configuration for the probe section which may achieve precise rotational scanning. The placement of the beam splitter in the rotatable probe section may prevent the differences created by the rotation at the transitional region between the fixed probe section and the rotating probe section from becoming superimposed on the path differences which are to be detected between the reference beam and the measuring beam.

The use is further facilitated by providing a modulation interferometer including a short-coherent light source arranged therein, or including a demodulation interferometer, which is physically separated from the probe section, the short-coherent light source being arranged in the rotatable probe section, in the fixed probe section, or outside the probe section. A configuration is achieved by coupling the probe section and the modulation interferometer or the demodulation interferometer via a monomode optical fiber.

A configuration is further achieved when the beam splitter is part of a common path interferometer system. This makes separate optical branches for the reference beam unnecessary and facilitates a compact configuration.

Various alternatives for the configuration of the measuring device are conventional as such in which the structure of the interferometer corresponds to that of a classic interferometer, a white light interferometer, or a heterodyne interferometer.

Furthermore, in an example embodiment of the present invention, the interferometer is configured as a multiwavelength interferometer for extending the measurement range.

Measurements in a very narrow channel or borehole, an injection nozzle, for example, are made possible by the fact that the probe section includes an optical measuring fiber in a measuring head for scanning the measurement object, a fiber section being arranged upstream from the measuring fiber, and an interface between the fiber section and measuring fiber being provided as the beam splitter. Measurements in boreholes having a diameter between 80 µm and 1 mm, for example, are thus possible. The measurement object end of the measuring fiber has a configuration which corresponds to the measurement task.

The measures according to the present invention further contribute to a configuration by the fact that the light from the light source is introduced into the fiber section via an additional optical fiber and a fiber beam splitter, and after illuminating the measurement object the light from the fiber section is introduced into the optical fiber.

For the configuration and operating principle of the interferometric measuring device as such, reference is made to the above-mentioned systems, in which additional literature citations regarding interferometric measuring devices are provided.

DETAILED DESCRIPTION

Figure 1:
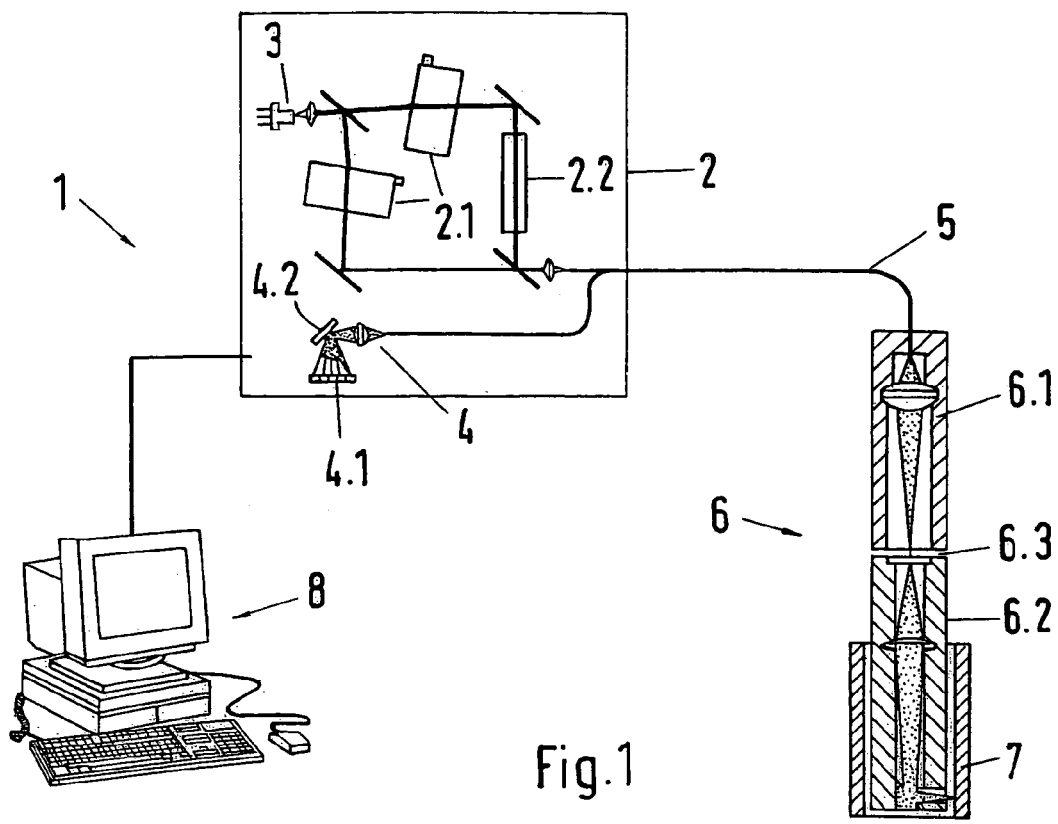
FIG. 1 illustrates an example embodiment of an interferometric measuring device including a modulation interferometer and a probe section physically separated therefrom, in a schematic illustration.

In an interferometric measuring device 1 illustrated in FIG. 1, a component including a modulation interferometer 2 and a component including a probe section 6 are physically separated from one another and may be connected by a monomode optical fiber 5. A receiver system 4 including a spectral element 4.2 and a photodetector system 4.1 is provided for receiving measurement light which is led from a scanned object surface of a measurement object 7 via monomode optical fiber 5, the output signals of the photodetector system being relayed to an evaluation device 8 for computational evaluation which may also assume control functions for interferometric measuring device 1.

The modulation interferometer includes a short-coherent, broadband light source 3, for example a superluminescence diode, in addition to two modulators 2.1, e.g., acousto-optic modulators, a delay element 2.2, for example a plane-parallel plate, arranged in one branch, two beam splitters, one for splitting the light beam into two partial light beams which are directed to the two modulators 2.1 and the other for recombining the split light beams, and two deflection elements. Such a modulation interferometer is described for example in above-mentioned German Patent Published Application No. 198 19 762, which also describes the operating principle in greater detail.

Probe section 6 includes a fixed probe section 6.1 and a rotatable probe section 6.2 mechanically and optically coupled thereto in which a beam splitter 6.3 is arranged. The positioning of beam splitter 6.3 in rotatable probe section 6.2 may provide that no path differences between the reference beam created by beam splitter 6.3 and the measuring beam result from the rotation, but instead, the changes which arise in the path difference are attributed to the surface characteristics or the shape, distance, or change in distance, for example vibrations, of the scanned surface of measurement object 7.

The light from short-coherent light source 3 for modulation interferometer 2 is collimated using a lens and is split into the two partial light beams. The modulation interferometer is configured according to the principle of a Mach-Zehnder interferometer, for example. The two partial light beams are mutually frequency shifted by modulators 2.1. The frequency difference is several kHz, for example. In one arm of modulation interferometer 2, delay element 2.2 creates a difference in the optical paths of the two partial light beams which is greater than the coherence length of light source 3. The two partial light beams are superimposed in the subsequent beam splitter and are injected into monomode optical fiber 5. The partial light beams do not interfere with one another on account of the optical path difference. The light is led to probe section 6 via an optical fiber where it is decoupled.

Besides beam splitter 6.3, rotatable probe section 6.2 contains additional optical elements which focus the admitted light beam on the surface of measurement object 7 to be measured. The optical path from beam splitter 6.3 to the measurement surface compensates for the optical path difference introduced in modulation interferometer 2. The light beam is split by beam splitter 6.3 into the measuring beam, which is led to the measurement object, and a reference beam. The wall of a borehole, for example, is scanned by the rotation of rotatable probe section 6.2 and the deviation in the shape of the inner cylinder is measured. The light reflected from the measurement surface is superimposed on the reference beam and injected into optical fiber 5. The light beams from the measuring beam and the reference beam may interfere with one another as a result of the compensation for the path difference. The light phase difference contains information on the distance from the measurement surface.

The light which is led to modulation interferometer 2 via optical fiber 5 is decoupled and split into multiple spectral portions having wavelengths $\lambda_1, \lambda_2, \ldots \lambda_n$ using a spectral element 4.2 such as a grating or prism, and is focused on photodetector system 4.1. Each photodetector sends an electrical signal having a difference frequency created by modulators 2.1 and a phase $\Delta\phi$ which is related to measurement variable $\Delta L$ for the distance from measurement object 7 and associated wavelength $\lambda_n$, according to the relationship $\Delta\phi = (2\cdot\pi/\lambda_n)\cdot\Delta L$.

Distance $\Delta L$, which may be greater than individual light wavelengths, may be unambiguously determined by measuring the phase differences of the signals from multiple photodetectors (multiwavelength heterodyne interferometry). The evaluation is performed using evaluation device 8.

Figure 2:
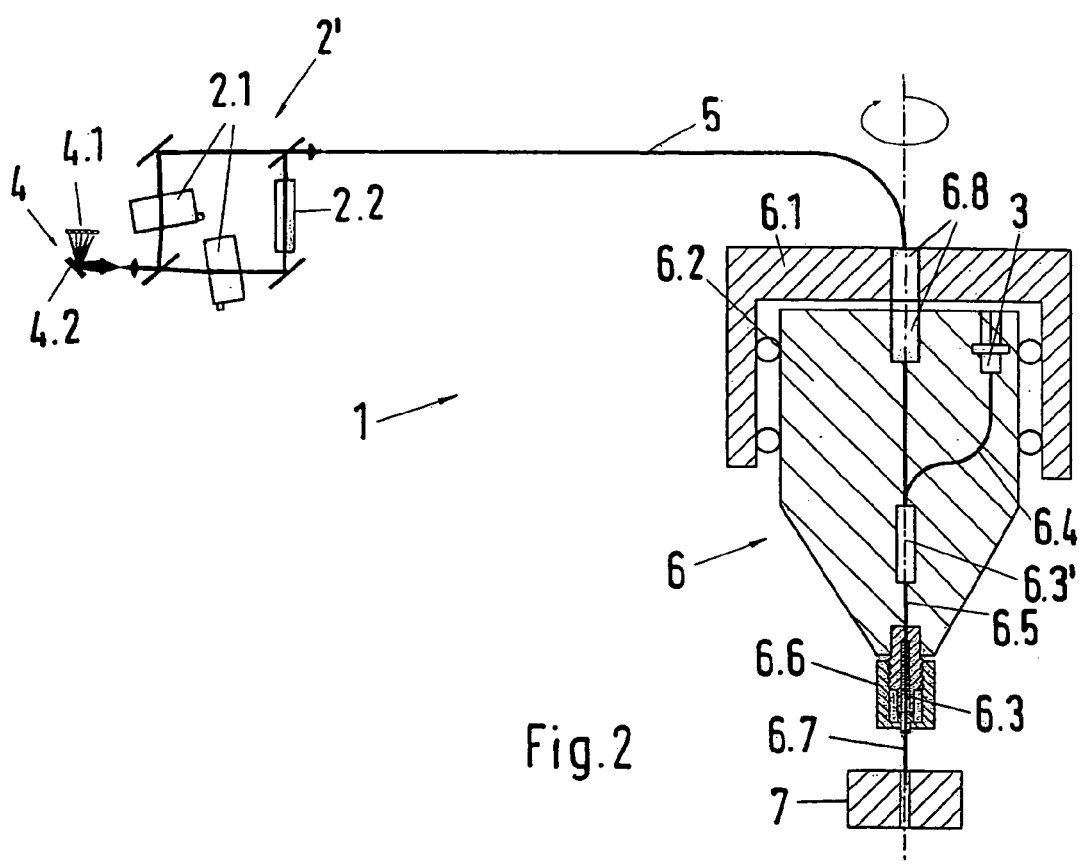
FIG. 2 illustrates another example embodiment of an interferometric measuring device in which a demodulation interferometer and a probe section physically separated therefrom are provided.

FIG. 2 illustrates another interferometric measuring device 1, for which the operating principle is similar to interferometric measuring device 1 illustrated in FIG. 1. In FIG. 2, however, interferometric measuring device 1 is coupled into a demodulation interferometer 2' and a probe section 6, at a distance from the demodulation interferometer, which is coupled by optical fiber 5, the probe section being divided into fixed probe section 6.1 and rotatable probe section 6.2.

Short-coherent light source 3, for example a superluminescence diode, is arranged in rotatable probe section 6.2. The light from this light source is injected into a fiber section 6.5 via an additional optical fiber 6.4, which may also be a monomode optical fiber, using a fiber beam splitter 6.3', the fiber section being coupled to a measuring fiber 6.7 facing measurement object 7 using a fiber connector in a measuring head 6.6. The surface of measurement object 7, for example a very narrow borehole of an injection nozzle, is optically scanned using measuring fiber 6.2, which is formed at the free end of the measuring fiber to illuminate the measurement surface and admit the light reflected therefrom.

The exit surface of fiber section 6.5 is coated at the transition to measuring fiber 6.7 in such a manner that it functions as a beam splitter 6.3. The light is split at this beam splitter 6.3 into two partial beams, the measuring beam and the reference beam. The reference beam is injected back into fiber section 6.5 and is directed into demodulation interferometer 2' via an optical coupler 6.8 at the transition between rotatable probe section 6.2 and fixed probe section 6.1. The measuring beam is decoupled from the measuring fiber, whose ends are specially treated, for example ground at an angle of 45° and metallized, and illuminates the inner wall of the small borehole of measurement object which is to be measured. Measuring fiber 6.7 has a diameter of 125 µm, for example. The light reflected from the wall of the borehole is injected into demodulation interferometer 2' via measuring fiber 6.7, fiber beam splitter 6.3', and optical coupler 6.8 and is superimposed on the reference beam. The two beams may not interfere with one another because the coherence length of light source 3 is shorter than half the length of measuring fiber 6.7. Demodulation interferometer 2' is configured according to the principle of a Mach-Zehnder interferometer, for example. The incident light is split into two partial light beams in demodulation interferometer 2'. In one arm of demodulation interferometer 2' delay element 2.2, also a plane-parallel glass plate, for example, is used which resets the difference in optical paths between the measuring beam and the reference beam which was forced in measuring head 6.6. The two partial light beams are mutually shifted, using modulators 2.1 which are acousto-optical modulators, for example, the frequency difference being, for example, several kHz here as well. The two partial light beams which are capable of interfering with one another are superimposed in an additional beam splitter, decoupled, split into multiple spectral portions having wavelengths $\lambda_1, \lambda_2, \ldots \lambda_n$ using a spectral element 4.2 such as a grating or prism, and focused on photodetector system 4.1. The evaluation is then performed according to the example embodiment illustrated in FIG. 1.

Information is transmitted from rotating probe section 6.2 to fixed probe section 6.1 via optical coupler 6.8, which may be configured, for example, in the form of two grin (gradient index) lenses arranged on the fiber ends of corresponding optical fibers 5. Since optical coupler 6.8 is arranged in the light path downstream from fiber beam splitter 6.3' or beam splitter 6.3, any small tilts or shifts in both probe sections 6.1, 6.2 do not cause interference during the rotation, so that the measurement results are not distorted by rotation during the scanning.

What is claimed is:

1. An interferometric measuring device for measuring at least one of surface characteristics, shapes, distances, vibrations, and changes in distance of measurement objects, comprising:
    a probe section subdivided into a fixed probe section and a rotatable probe section mechanically and optically coupled to the fixed probe section;
    a beam splitter arranged in the rotatable probe section configured to create a reference beam and a measuring beam for interferometric measurement;
    a demodulation interferometer physically separated from the probe section; and
    a short-coherent light source arranged in the rotatable probe section.

2. The interferometric measuring device of claim 1, wherein the probe section and the demodulation interferometer are coupled to one another via a monomode optical fiber.

3. The interferometric measuring device of claim 1, wherein the beam splitter is arranged in a common path interferometer system.

4. The interferometric measuring device of claim 1, wherein the demodulation interferometer is arranged as one of a classic interferometer, a white light interferometer, and a heterodyne interferometer.

5. The interferometric measuring device of claim 4, wherein the demodulation interferometer is configured as a multiwavelength interferometer configured to extend a measurement range.

6. The interferometric measuring device of claim 1, wherein the probe section includes an optical measuring fiber in a measuring head configured to scan a measurement object, a fiber section arranged upstream from the optical measuring fiber, the beam splitter including an interface between the fiber section and the optical measuring fiber.

7. The interferometric measuring device of claim 6, further comprising an additional optical fiber and a fiber beam splitter configured to introduce light from a short-coherent light source into the fiber section and an arrangement configured to introduce the light from the fiber section into the optical fiber after illumination of the measurement object.

8. The interferometric measuring device of claim 1, further comprising:
    an optical coupler arranged between the fixed probe section and the rotatable probe section.

9. The interferometric measuring device of claim 6, wherein the optical measuring fiber is ground and metallized at an end thereof.

10. The interferometric measuring device of claim 6, wherein the demodulation interferometer includes:
    a spectral element including one of a grating and a prism, and
    a photo-detector.

* * * * *